United States Patent
An et al.

(10) Patent No.: US 10,151,930 B2
(45) Date of Patent: Dec. 11, 2018

(54) STEREOSCOPIC IMAGE DISPLAY DEVICE HAVING A BARRIER CELL

(75) Inventors: Cheung-Hwan An, Seoul (KR); Jae-Woo Lee, Paju-si (KR); Sung-Min Jung, Incheon (KR)

(73) Assignee: LG DISPLAY CO., LTD., Seoul (KR)

( * ) Notice: Subject to any disclaimer, the term of this patent is extended or adjusted under 35 U.S.C. 154(b) by 221 days.

(21) Appl. No.: 13/605,647

(22) Filed: Sep. 6, 2012

(65) Prior Publication Data
US 2013/0057789 A1   Mar. 7, 2013

(30) Foreign Application Priority Data
Sep. 7, 2011   (KR) .................. 10-2011-0090942

(51) Int. Cl.
| G02B 6/02 | (2006.01) |
| G02B 27/22 | (2018.01) |
| H04N 13/31 | (2018.01) |
| H04N 13/351 | (2018.01) |
| G02F 1/13 | (2006.01) |

(52) U.S. Cl.
CPC ....... G02B 27/2214 (2013.01); G02B 27/225 (2013.01); H04N 13/31 (2018.05); H04N 13/351 (2018.05); G02F 1/13 (2013.01)

(58) Field of Classification Search
USPC .......................................... 349/15
See application file for complete search history.

(56) References Cited

U.S. PATENT DOCUMENTS

| 2003/0048354 A1* | 3/2003 | Takemoto .......... H04N 13/0048 348/51 |
| 2007/0188667 A1* | 8/2007 | Schwerdtner .................. 349/15 |
| 2009/0015738 A1* | 1/2009 | Hong ................ G02B 27/225 349/15 |
| 2010/0315492 A1 | 12/2010 | Baik et al. |
| 2012/0013606 A1* | 1/2012 | Tsai et al. .................... 345/419 |
| 2012/0268673 A1* | 10/2012 | Sakamoto et al. ............. 349/15 |

FOREIGN PATENT DOCUMENTS

| CN | 101587693 A | 11/2009 |
| CN | 101939998 A | 1/2011 |
| JP | 2011-141546 A | 7/2011 |
| KR | 10-2009-0006473 A | 1/2009 |
| KR | 10-2010-0033672 A | 3/2010 |
| WO | WO 2008/020399 A1 | 2/2008 |

* cited by examiner

*Primary Examiner* — Lauren Nguyen
(74) *Attorney, Agent, or Firm* — Birch, Stewart, Kolasch & Birch, LLP (57) ABSTRACT

Discussed is a stereoscopic image display device, which acquires design parameters based on the same aperture ratio and the same back distance regarding a single barrier cell when displaying different numbers of views using the barrier cell. The barrier cell, which includes first and second substrates opposite to each other, first electrodes arranged at an interval on the first substrate, a second electrode formed on the second substrate, and a liquid crystal layer between the first and second substrates, is driven to display different numbers of views. Assuming that a region of the barrier cell corresponding to a small view number is one unit, the number of unit drive regions divided in one unit is defined by K/A (where, 'A' is an aperture ratio of the barrier cell, and 'K' is {large view number/small view number}*n ('n' is a natural number between 1 and the small view number).

16 Claims, 7 Drawing Sheets

STEREOSCOPIC IMAGE DISPLAY DEVICE HAVING A BARRIER CELL

This application claims the benefit of the Korean Patent Application No. 10-2011-0090942, filed on Sep. 7, 2011, which is hereby incorporated by reference as if fully set forth herein.

BACKGROUND OF THE INVENTION

Field of the Invention

The present invention relates to a stereoscopic image display device, and more particularly, to a stereoscopic image display device, which acquires design parameters based on the same aperture ratio and the same back distance with respect to a single barrier cell when displaying different numbers of views using the barrier cell.

Discussion of the Related Art

At present, services for rapid dissemination of information, to be constructed based on high-speed information communication networks, have developed from a simple "listening and speaking" service, such as current telephones, to a "watching and listening" multimedia type service based on digital terminals used for high-speed processing of characters, voices and images, and are expected to be ultimately developed into hyperspace 3-Dimensional (3D) stereoscopic information communication services enabling virtual reality and stereoscopic viewing free from the restrains of time and space.

In general, stereoscopic images representing a 3-Dimension (3D) are realized based on the principle of stereo-vision via the viewer's eyes. However, since the viewer's eyes are spaced apart from each other by about 65 mm, i.e. have a binocular parallax, the left and right eyes perceive slightly different images due to a positional difference between the two eyes. Such an image difference due to the positional difference between the two eyes is called binocular disparity. Also, a 3D stereoscopic image display device is designed based on binocular disparity to allow the left eye to view only an image for the left eye and the right eye to view only an image for the right eye.

More specifically, when the left and right eyes view different 2D images, respectively, and the two different images are transmitted to the brain through the retina, the brain accurately combines the images, reproducing depth perception and realism of an original 3D image. This ability is conventionally referred to as stereography (stereoscopy), and a display device to which stereoscopy is applied is referred to as a stereoscopic display device.

Stereoscopic display devices may be classified into glasses-type stereoscopic display devices and non-glasses type stereoscopic display devices. Representative examples of non-glasses type stereoscopic display devices include a parallax barrier type device and a liquid-crystal electric-field lens type device based on a method of realizing a 3D image.

However, conventional stereoscopic image display devices as described above have problems as follows.

In the conventional stereoscopic image display devices, image data, driving pixels of an image panel, and views of a switching cell (e.g., a barrier cell) should correspond to one another on a one to one ratio. Thus, it is difficult to deal with any change in image content or in the number of views of the image panel, and there is a need for a switching cell having different barriers depending on different numbers of views. Moreover, whenever the switching cell is changed, the aperture ratio of the barrier and the back distance are also changed, which causes a structural limit to allow a single stereoscopic image display device to have different numbers of views.

That is, difficulty in displaying different numbers of views using a single stereoscopic image display device results in a limit in representation of various content.

SUMMARY OF THE INVENTION

Accordingly, the present invention is directed to a stereoscopic image display device that substantially obviates one or more problems due to limitations and disadvantages of the related art.

An object of the present invention is to provide a stereoscopic image display device, which acquires design parameters based on the same aperture ratio and the same back distance with respect to a single barrier cell when displaying different numbers of views using the barrier cell.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a stereoscopic image display device includes an image panel, and a barrier cell including a first substrate and a second substrate opposite to each other, a plurality of first electrodes arranged at an interval on the first substrate to extend in a first direction, a second electrode formed on the second substrate, and a liquid crystal layer formed between the first and second substrates, wherein the barrier cell is driven to display different numbers of views, and wherein, assuming that a region of the barrier cell corresponding to a small view number is one unit, the number of unit drive regions divided in one unit is defined by K/A (where, 'A' is an aperture ratio of the barrier cell, and 'K' is {large view number/small view number)*n ('n' is a natural number between 1 and the small view number).

A value of 'n' may be selected to allow a value of K to be represented by the minimum multiple natural value.

The same back distance and the same aperture ratio may be maintained during driving under the different numbers of views.

The unit drive regions may have the same width when driving under the small view number and driving under the large view number.

The same number of first electrodes may be arranged in each unit drive region.

The stereoscopic image display device may further include a voltage source to apply common voltage to the second electrode and to selectively apply common voltage or drive voltage to the first electrodes.

The voltage source applies the same drive voltage to the first electrodes corresponding to the each unit drive region.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Hereinafter, a stereoscopic image display device according to the present invention will be described in detail with reference to the accompanying drawings.

Figure 1:
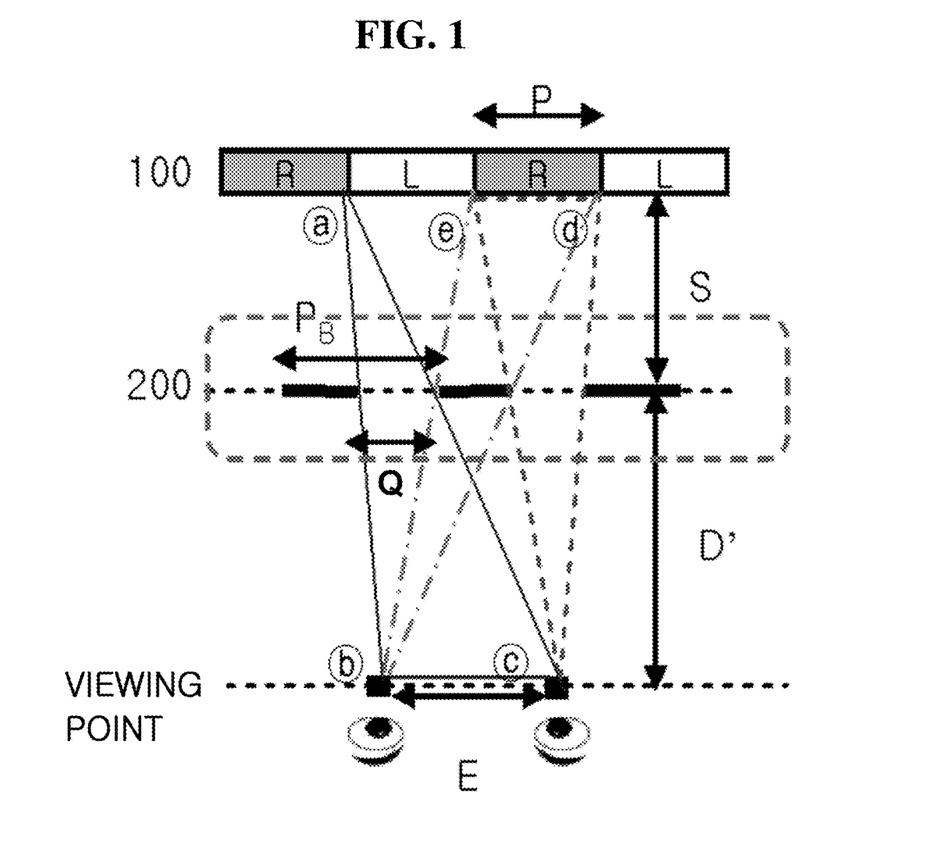
FIG. 1 is a sectional view illustrating a stereoscopic image display device according to the present invention.

FIG. 1 is a sectional view illustrating a stereoscopic image display device according to the present invention.

As illustrated in FIG. 1, the stereoscopic image display device according to the present invention includes an image panel 100, and a parallax barrier cell 200 disposed on the image panel 100. In the present invention, the parallax barrier cell 200 is switchable to display a 2D image or a 3D image and to display different numbers of views depending on application or non-application of voltage.

A light source may be further disposed beneath the image panel 100.

There is illustrated an example in which a viewer is located at the lower side of the drawing. In the case of providing the light source, assuming that the image panel 100 is oriented perpendicular to the ground, the light source is also erected perpendicular to the ground at a position farthest away from the viewer. On the other hand, assuming that the image panel 100 is oriented parallel to the ground, the light source is located at the lowest position close to the ground.

Whether or not to include the light source is determined based on whether the image panel 100 is an active luminescent element or a passive luminescent element. For example, the image panel 100 may be any one of a liquid crystal panel, organic luminescent display panel, field emission display panel, plasma display panel, quantum dot panel, and electrophoretic display panel, and where appropriate may be applied even to some kinds of flat panel display panels that will be developed in the future. When the image panel 100 is the liquid crystal panel among the aforementioned ones, provision of a light source may be necessary.

The image panel 100 includes R, G and B sub-pixels vertically arranged by a long length, and the R, G and B sub-pixels of each line constitute a single pixel to display an image. A view image corresponding to each sub-pixel is determined based on the number of views in a 3D mode. For example, in the case of 2-view display, a first view is defined by a region where a left-eye image is allotted, and a second view is defined by a region where a right-eye image is allotted. Each view corresponds to several of sub-pixels or a single sub-pixel. In the case of 4-view display, first to fourth views constitute a single unit, and each view corresponds to several of sub-pixels or a single sub-pixel.

In the stereoscopic image display device of the present invention, the parallax barrier cell 200 serves to display different numbers of views.

In one example, assuming that the parallax barrier cell 200 performs both 2-view display and 4-view display, two views constitute a single unit upon 2-view display and four views constitute a single unit upon 4-view display. In either case, the corresponding unit is repeatedly organized and arranged.

The parallax barrier cell 200 is an element that is driven in response to applied voltage, and more particularly, is an active element in which a liquid crystal layer is changeable in arrangement of liquid crystals when voltage is applied thereto. As such, the parallax barrier cell 200 functions as a transparent cell when voltage is not applied. On the other hand, in a 3D mode corresponding to voltage application, the parallax barrier cell 200 is divided into a barrier region and an aperture region on a per unit basis. That is, the aperture region is driven to exhibit white, and the barrier region is driven to exhibit black. For example, drive voltage is applied to create an electric field in the barrier region in the case of a normally white mode, whereas drive voltage is applied to create an electric field in the aperture region in the case of a normally black mode.

In the drawing, 'P' denotes the width of a single view where a left-eye image or right-eye image emerges from the image panel. Further, '$P_B$' denotes a pitch of a barrier including a shield and an aperture within a single unit produced by the parallax barrier cell. The drawing illustrates a 2-view state.

This relationship is acquired by the following Equation 1 related to a focal distance, the following Equation 2 based on proportional geometry of a triangle, and the following Equation 3 based on Snell's law.

$$P_B = \frac{N}{1/E + 1/P} \qquad \text{Equation 1}$$

where, 'E' denotes an inter-ocular distance, 'P' denotes a pitch of one sub-pixel of the image panel, and 'N' denotes the number of views. In the drawing, one sub-pixel and one view correspond to each other on a one to one ratio.

$$D' = \frac{S \cdot E}{P} \qquad \text{Equation 2}$$

$$D = \frac{\sqrt{D'^2 - (n^2 - 1)h^2}}{n} \qquad \text{Equation 3}$$

where, 'S' denotes a distance between the barrier cell and the image panel, i.e. a back distance, 'n' denotes a refractive index of a glass substrate present between the image panel and the barrier cell, and 'h' denotes one half of a horizontal length of the image panel.

Also, "D'" denotes a viewing distance with respect to the parallax barrier cell in the drawing. Further, "D" of Equation 3 denotes an actual viewing distance obtained by compensating a difference between refractive indices of air and the glass substrate.

Hereinafter, display of different numbers of views by the parallax barrier cell 200 will be described. Although the following description explains the parallax barrier cell 200 as performing both 2-view display and 4-view display by way of example, the disclosure is not limited thereto. In another example, the parallax barrier cell 200 may display any other numbers of views so long as the number of views is adjustable via application of voltage to the barrier cell.

Figure 2A:
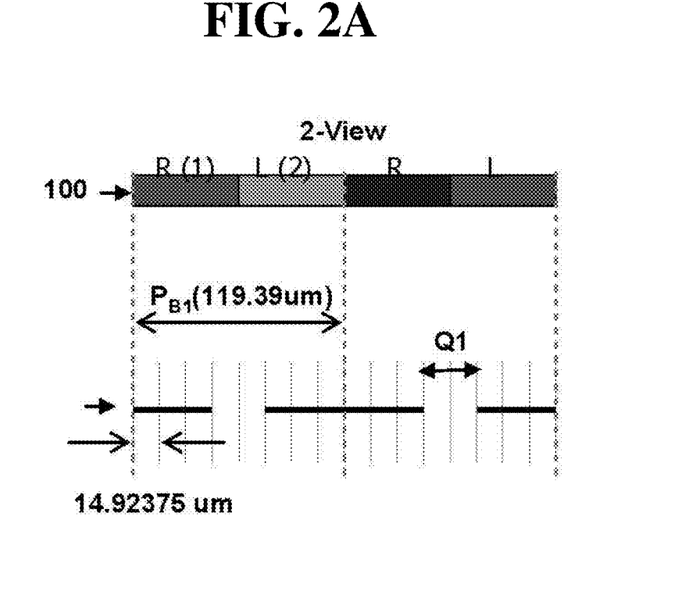
FIGS. 2A and 2B are sectional views illustrating an image panel and barrier cell respectively upon 2-view display and 4-view display of FIG. 1.
Figure 2B:
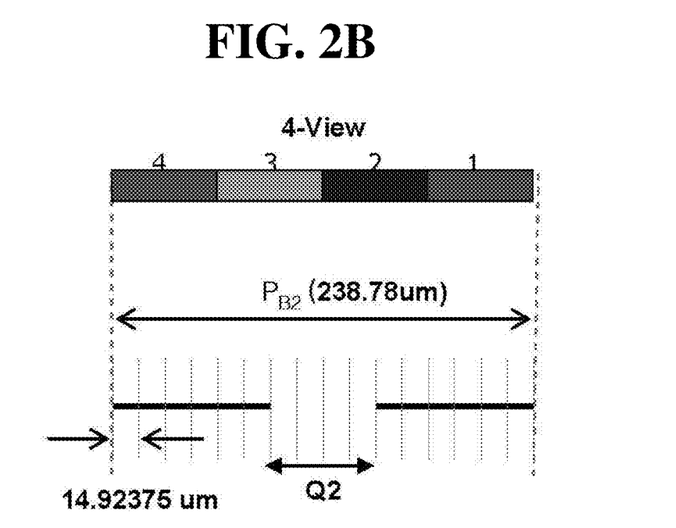
Figure 3:
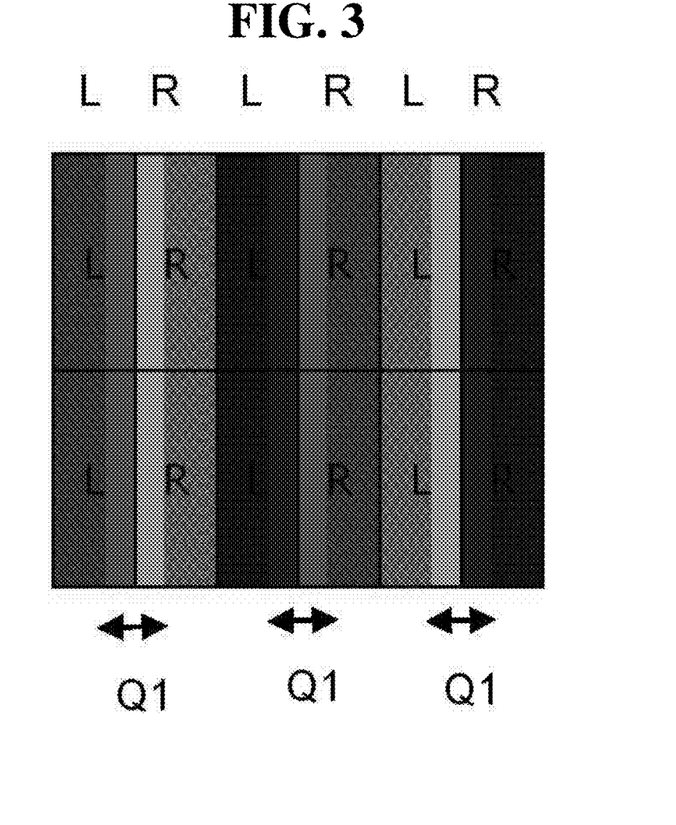
FIG. 3 is a plan view illustrating a bonded state of the image panel and barrier cell of FIG. 1.

FIGS. 2A and 2B are sectional views illustrating the image panel and barrier cell respectively upon 2-view display and 4-view display of FIG. 1, and FIG. 3 is a plan view illustrating a bonded state of the image panel and barrier cell of FIG. 1.

As illustrated in FIGS. 2A and 2B, in the stereoscopic image display device of the present invention, the single barrier cell can perform both 2-view display and 4-view display. Assuming that a region of the barrier cell 200 corresponding to a small view number is a single unit ($P_{B1}$, $P_{B2}$), the number of unit drive regions divided in the single unit ($P_{B1}$, $P_{B2}$) is defined by K/A (where, 'A' denotes an aperture ratio of the barrier cell, and 'K' is {large view number/small view number}).

In this case, since 2-view display and 4-view display are employed, 'K' has a value of 2. Also, in the illustrated example, the aperture ratio is set to 25%.

Based on the above equations, Equation of calculating the number of unit drive regions within a single unit corresponding to a small view number is represented as follows:

$$N = K/A \text{ (where, 'A' denotes an aperture ratio of the barrier cell, and 'K' is \{large view number/small view number\}*}n).$$

Here, 'n' is selected from among natural values from 1 to the small view number to make K be represented by the minimum multiple natural value.

In the illustrated example, it will be appreciated that N is 2/0.25=8.

When the barrier cell 200 utilizes two view numbers including a large view number and a small view number, the number of unit drive regions denotes the minimum number of drive regions within a single unit ($P_{B1}$, $P_{B2}$) that must be divided to maintain the same aperture ratio.

In the illustrated example, the small view number is 2, and thus, 2 views are divided into 8 unit drive regions. Since the aperture ratio is 25%, 8*0.25=2. That is, 2 unit drive regions define an aperture Q1.

In the case of 4-view display, the same aperture ratio of 25% is maintained, but the width of a single unit ($P_{B1}$, $P_{B2}$) is two times as compared to 2-view display, and the number of unit drive regions is also 8*2=16. Thus, the number of unit drive regions corresponding to an aperture Q2 is 16*0.25=4.

In the illustrated example, the width of a single unit when the barrier cell employs 2-view display is 119.39 μm and the width of a single unit when the barrier cell employs 4-view display is 238.78 μm. However, this is given by way of example and the width is changeable. Also, the aperture ratio is changeable to different values other than 25%. However, the aperture ratio has a fixed value on the basis of the same length of the barrier cell. The above described aperture ratio of 25% is given by way of example on the basis of the length of 15.6 inches, and may be increased or decreased in response to an increase or decrease in the length of the barrier cell.

In the present invention, the single barrier cell 200, which serves to display different numbers of views, is designed to satisfy the requirement of N=K/A (where, 'A' is the aperture ratio of the barrier cell, and 'K' is {large view number/small view number}). Also, the barrier cell 200 is designed to maintain the same aperture ratio and the same back distance even if the barrier cell 200 displays different numbers of views, which allows the viewer to freely view 3D images displayed via switching between 2 view numbers at a corresponding viewing distance.

Switching between different view numbers is possible by changing voltage application conditions with respect to electrodes included in the barrier cell 200.

For example, if a large view number is 3 and a small view number is 2, 'K' denoted by {large number view/small number view}' is 1.5, and thus 'n' is set to 2 to allow 'K' to have the minimum multiple natural value of 1.5. In this case, K is 3.

Similar to the above description, assuming that the aperture ratio is 25%, N is 3/0.25=6.

In this case, 'n' is set to 1 if the value of large view number/small view number is an integer. On the other hand, if the value of large view number/small view number is less than 1 other than an integer, 'n' is a value to be multiplied to allow 'K' to have the minimum multiple natural value. The maximum value of 'n' corresponds to the small view number. That is, 'n' may be selected from 1 and 2 if the small view number is 2, and may be selected from among integers from 1 to 3 if the small view number is 3.

Figure 4A:
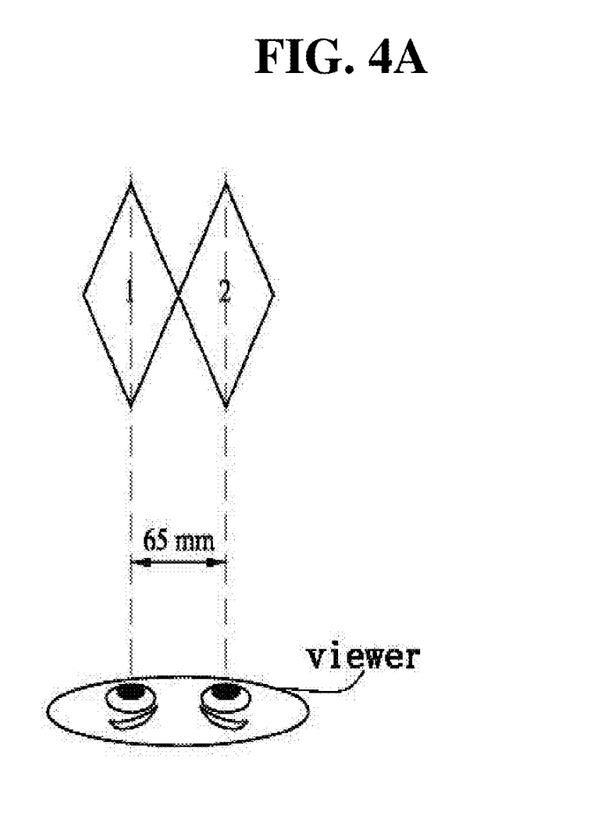
FIGS. 4A and 4B are views illustrating viewing by a viewer respectively upon 2-view display and 4-view display.
Figure 4B:
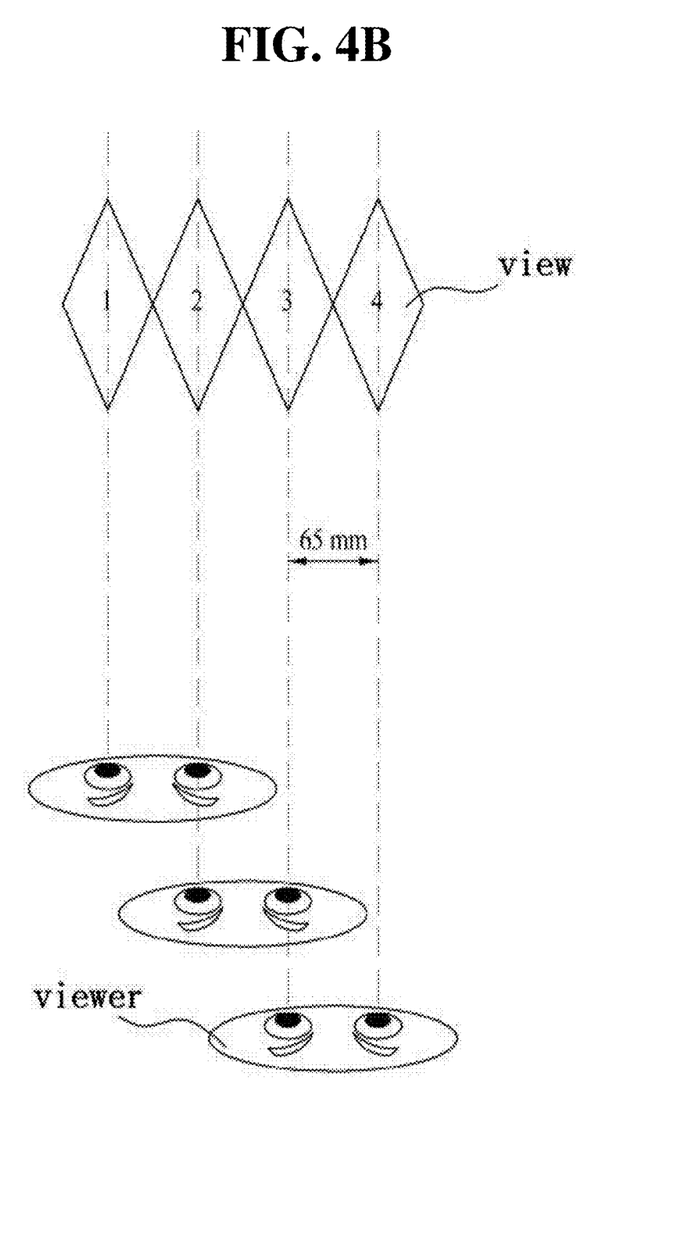

FIGS. 4A and 4B are views illustrating viewing by the viewer respectively upon 2-view display and 4-view display.

As illustrated in FIG. 4A, in the case of 2-view display, the left eye and the right eye of the viewer respectively capture a first view and a second view, and the viewer can recognize a 3D image via blending of the two views.

As illustrated in FIG. 4B, in the case of 4-view display, the left eye and the right eye of the viewer respectively capture first and second views, second and third views, or third and fourth views, and the viewer can recognize a 3D image via blending of the respective two views. That is, in the case of 4-view display, the left eye and the right eye sequentially captures two views based on binocular disparity, and this is advantageous to allow the viewer who is in motion to view a 3D image.

Here, the view may be referred to as the minimum image unit emerged from the image panel on a per pixel basis or on a per sub-pixel basis.

Meanwhile, in the above described stereoscopic image display device of the present invention, the barrier cell for display of different numbers of views has the following configuration.

Figure 5:
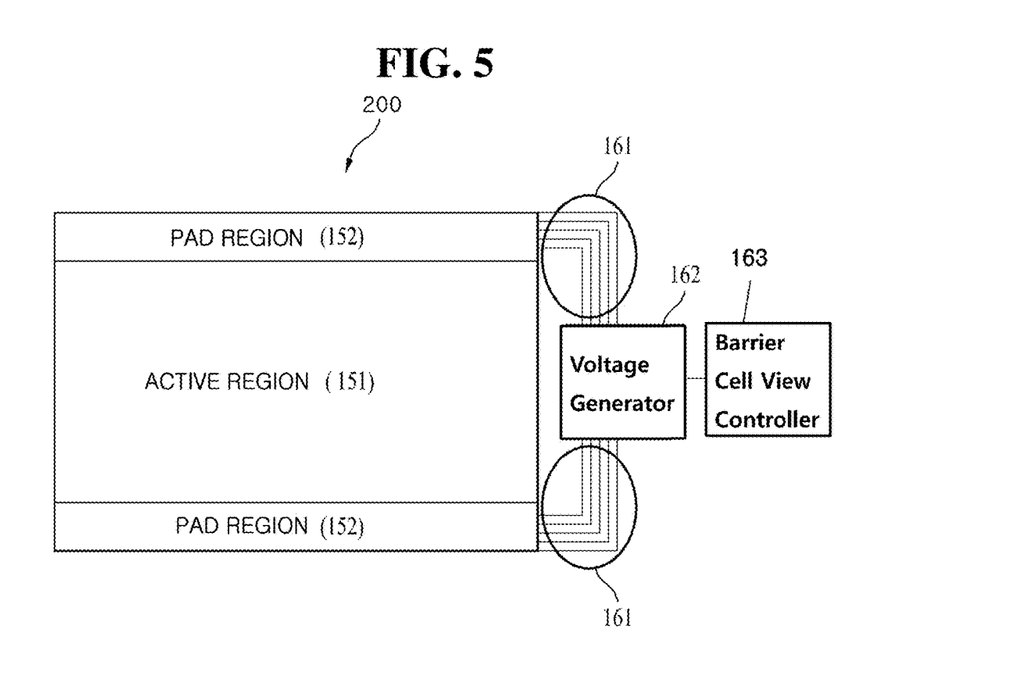
FIG. 5 is a block diagram illustrating a drive mechanism for a barrier cell of a stereoscopic image display device according to the present invention.

FIG. 5 is a block diagram illustrating a drive mechanism for the barrier cell of the stereoscopic image display device according to the present invention.

As illustrated in FIG. 5, the drive mechanism of the barrier cell 200 includes a barrier cell view controller 163 that selects the number of views upon 3D display, a voltage generator 162 that generates voltage corresponding to the selected number of views, and a voltage applier 161 that applies the generated voltage to electrodes included in the barrier cell.

The voltage applier 161 is connected to a pad region 152 located at an outer perimeter of the barrier cell 200. The pad region 152 contains metal wires respectively connected to ends of electrodes of an active region 151 that is included in the barrier cell. The active region 151 functions as an actual barrier. The metal wires are directly connected to the voltage applier 161 to receive drive voltage.

Figure 6A:
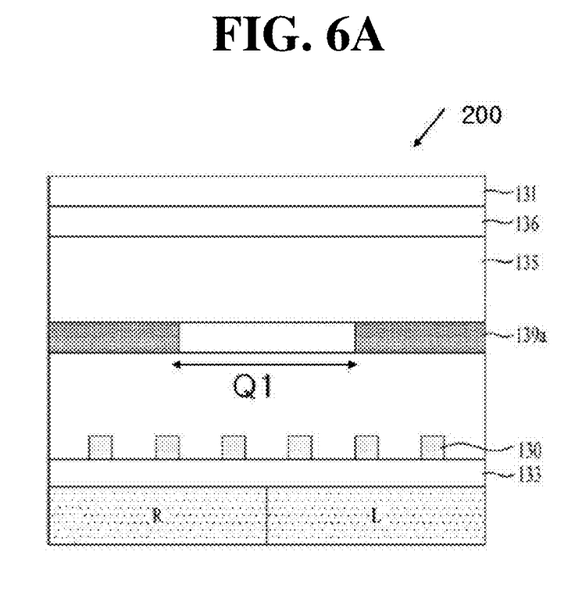
FIGS. 6A and 6B are sectional views illustrating an aperture of a barrier cell respectively upon 2-view display and 4-view display of FIG. 5.
Figure 6B:
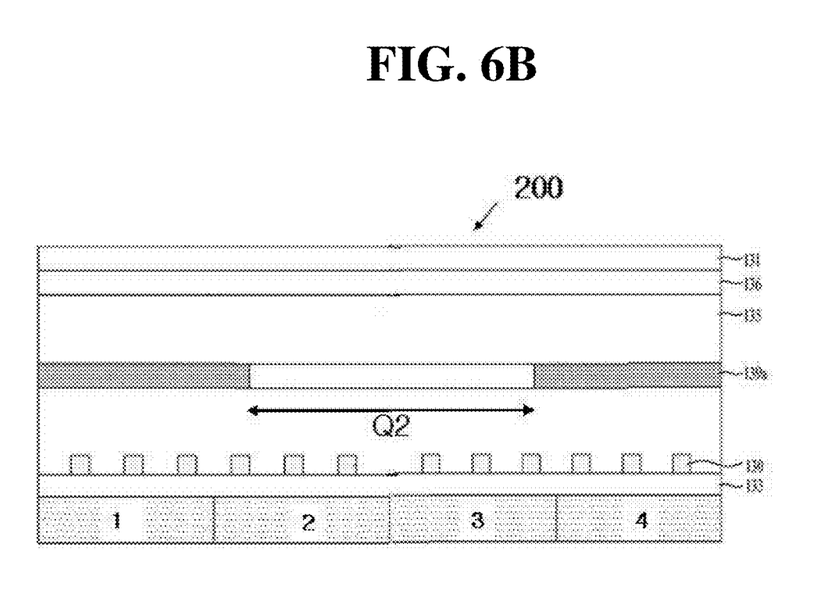

FIGS. 6A and 6B are sectional views illustrating an aperture of the barrier cell respectively upon 2-view display and 4-view display of FIG. 5.

As illustrated in FIGS. 6A and 6B, the barrier cell 200 includes a first substrate 133 and a second substrate 131 arranged opposite to each other, a plurality of first electrodes 130 arranged at an interval on the first substrate 133 to extend in a first direction, a second electrode 136 formed on the second substrate 131, and a liquid crystal layer 135 formed between the first and second substrates 133 and 131.

Referring to FIG. 6A illustrating 2-view display, if the barrier cell is in a normally black mode, drive voltage, which differs from common voltage applied to the second electrode 136, is applied to only some of the first electrodes 130 corresponding to an aperture Q1. In this case, the common voltage is applied to the other first electrodes.

On the contrary, if the barrier cell is in a normally white mode, drive voltage, which differs from common voltage applied to the second electrode 136, is applied to only some of the first electrodes 130 corresponding to a shield.

Each of the aperture Q1 and the shield has a width corresponding to the integer multiple of a unit drive region described with reference to FIGS. 2 and 3. As described above, in the case of 2-view display, the aperture Q1 corresponds to two unit drive regions.

Referring to FIG. 6B illustrating 4-view display, if the barrier cell is in a normally black mode, drive voltage, which differs from common voltage applied to the second electrode 136, is applied to the first electrodes 130 corresponding to only an aperture Q2. In this case, the common voltage is applied to the other first electrodes.

On the contrary, if the barrier cell is in a normally white mode, drive voltage, which differs from common voltage applied to the second electrode 136, is applied to only some of the first electrodes 130 corresponding to a shield. That is, voltage application conditions are equal to those of 2-view display assuming that the same aperture ratio is maintained.

In the case of 4-view display, the aperture Q2 corresponds to four unit drive regions.

As is apparent from the above description, through a stereoscopic image display device according to the present invention, as a result of calculating design parameters with respect to the minimum unit drive region, a single parallax barrier cell can be switched to display different numbers of views.

Further, the single parallax barrier cell can be driven like two barriers by maintaining the same aperture ratio and the same back distance during display of different numbers of views. That is, the parallax barrier cell in the form of a single mask can serve as barriers having different numbers of views.

Furthermore, providing equations for calculation of design parameters of the minimum unit drive region can result in ability to deal with driving under various numbers of views.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A stereoscopic image display device comprising:
   an image panel including R sub-pixels, G sub-pixels, and B sub-pixels vertically arranged by a long length, wherein the R, G, and B sub-pixels of each line constitute a single pixel, and wherein each view corresponds to at least one sub-pixel;
   a barrier cell on the image panel without interposing any elements between the image panel and the barrier cell, the barrier cell including:
      a first substrate and a second substrate opposite to each other,
      a plurality of first electrodes arranged on the first substrate extending in a first direction,
      a single second electrode formed on the second substrate, and
      a liquid crystal layer formed between the first and second substrates; and
   a voltage source to apply a common voltage to the second electrode and to selectively apply the common voltage or a drive voltage to the first electrodes,
   wherein the barrier cell performs a 2-view display or at least a 4-view display in which two views or at least four views constitute a single unit which is repeatedly arranged, and each view corresponds to at least one sub-pixel,
   wherein the barrier cell varies a width of an aperture region of the barrier cell corresponding to a number of the first electrodes which the driving voltage is applied to,
   wherein a back distance between the image panel and the barrier cell is maintained to be the same, regardless of whether 2 views or at least 4 views,
   wherein an aperture ratio of the barrier cell is maintained to be the same, regardless of whether the image panel displays 2 views or at least 4 views,
   wherein the width of the aperture region is determined based on a number of unit drive regions divided in one unit corresponding to the 2 views, and the number of unit drive regions is defined by K/A, where 'A' is the aperture ratio of the barrier cell, and 'K' is {at least four/two}*n', where 'n' is a natural number not exceeding the 2 views and is to allow K to be represented by a minimum multiple natural number, and the number of unit drive regions refers to a minimum number of drive regions within the one unit divided to maintain the same aperture ratio, and
   wherein the barrier cell has a first aperture region in the 2-view display, and has a second aperture region wider than the first aperture region in the at least 4-view display.

2. The device according to claim 1, wherein the unit drive regions have the same width when driving under the two views and when driving under the at least four views.

3. The device according to claim 2, wherein a same number of first electrodes are arranged in each unit drive region.

4. The device according to claim 1, wherein, the voltage source applies the same drive voltage to the first electrodes corresponding to the width of the aperture region of the barrier cell.

5. The device according to claim 1, wherein the at least four views provide the spectroscopic image viewable from at least a first distance away from the image panel and at least a second distance away from the display panel, wherein the second distance is further away from the image panel than the first distance.

6. The device according to claim 1, wherein the barrier cell is further configured to arrange a barrier region and the aperture region to cause the image panel to display one view comprising a two-dimensional (2D) image.

7. The device according to claim 1, wherein the aperture ratio is a fixed value based on the same length of the barrier cell.

8. A stereoscopic image display device comprising:
- an image panel configured to selectively display a three-dimensional (3D) image with a plurality of views, each of the plurality of views displaying a same image being used to form the 3D image, wherein the image panel includes R sub-pixels, G sub-pixels, and B sub-pixels vertically arranged by a long length, and the R, G, and B sub-pixels of each line constitute a single pixel, and wherein each view corresponds to at least one sub-pixel;
- a barrier cell on the image panel without interposing any elements between the image panel and the barrier cell, the barrier cell including:
  - a first substrate and a second substrate opposite to each other,
  - a plurality of first electrodes arranged on the first substrate extending in a first direction,
  - a second electrode formed on the second substrate, and
  - a liquid crystal layer formed between the first and second substrates; and
  - a voltage source to apply a common voltage to the second electrode and to selectively apply the common voltage or a drive voltage to the first electrodes,
- wherein the barrier cell performs a 2-view display or at least a 4-view display in which two views or at least four views constitute a single unit which is repeatedly arranged, and each view corresponds to at least one sub-pixel,
- wherein the barrier cell varies a width of an aperture region of the barrier cell corresponding to a number of the first electrodes which the driving voltage is applied to, the barrier cell changing to switch between first and second arrangements,
- wherein the width of the aperture region is determined based on a number of unit drive regions divided in one unit corresponding to the two views, and the number of unit drive regions is defined by K/A, where 'A' is an aperture ratio of the barrier cell, and 'K' is '{at least four/two}*n', where 'n' is a natural number not exceeding two and is to allow K to be represented by a minimum multiple natural number, and the number of unit drive regions refers to a minimum number of drive regions within the one unit divided to maintain the same aperture ratio,
- wherein, in the first arrangement, the barrier cell arranges a barrier region and the aperture region to cause the image panel to simultaneously display the two views among the plurality of views, the two views forming the 3D image,
- wherein, in the second arrangement, the barrier cell arranges the barrier region and the aperture region to cause the image panel to simultaneously display the at least four views among the plurality of views, two adjacent views among the at least four views forming the 3D image, and
- wherein the barrier cell has a first aperture region in the 2-view display, and has a second aperture region wider than the first aperture region in the at least 4-view display.

9. The device according to claim 8, wherein a back distance between the image panel and the barrier cell is maintained to be the same, regardless of whether the barrier cell performs the 2-view display or the at least 4-view display.

10. The device according to claim 8, wherein a back distance between the image panel and the barrier cell is maintained to be the same and the aperture ratio of the barrier cell is maintained to be the same, regardless of whether barrier cell performs the 2-view display or the at least 4-view display.

11. The device according to claim 8, wherein the at least four views provide the 3D image viewable from at least a first distance away from the image panel and at least a second distance away from the display panel, wherein the second distance is further away from the image panel than the first distance.

12. The device according to claim 8, wherein the barrier cell is further configured to arrange the barrier region and the aperture region to cause the image panel to display one view comprising a two-dimensional (2D) image.

13. The device according to claim 8, wherein the unit drive regions have the same width when driving under the two views and when driving under the at least four views.

14. The device according to claim 8, wherein the aperture ratio is a fixed value based on the same length of the barrier cell.

15. The device according to claim 1, wherein the second aperture region is twice as wide as the first aperture region.

16. The device according to claim 8, wherein the second aperture region is twice as wide as the first aperture region.

* * * * *